(12) United States Patent
Adjanohoun et al.

(10) Patent No.: US 9,968,074 B2
(45) Date of Patent: May 15, 2018

(54) DEVICE FOR REORIENTATION OF AN EGG IN A CELLULAR TRAY

(71) Applicant: Egg-Chick Automated Technologies, Landivisiau (FR)

(72) Inventors: Ephrem Adjanohoun, Pace (FR); Florent Menguy, Brest (FR)

(73) Assignee: EGG-CHICK AUTOMATED TECHNOLOGIES, Landivisiau (FR)

( * ) Notice: Subject to any disclaimer, the term of this patent is extended or adjusted under 35 U.S.C. 154(b) by 0 days. days.

(21) Appl. No.: 15/024,401

(22) PCT Filed: Aug. 20, 2014

(86) PCT No.: PCT/FR2014/052104
§ 371 (c)(1),
(2) Date: May 23, 2016

(87) PCT Pub. No.: WO2015/044547
PCT Pub. Date: Apr. 2, 2015

(65) Prior Publication Data
US 2016/0302395 A1    Oct. 20, 2016

(30) Foreign Application Priority Data
Sep. 24, 2013  (FR) ...................................... 13 59201

(51) Int. Cl.
*A01K 41/06*    (2006.01)
*B65B 23/06*    (2006.01)
*A01K 45/00*    (2006.01)

(52) U.S. Cl.
CPC ............ *A01K 45/007* (2013.01); *A01K 41/06* (2013.01); *B65B 23/06* (2013.01)

(58) Field of Classification Search
CPC ......... B65B 23/06; B65B 35/56; A01K 41/06; B65D 85/32; A61B 50/22; A61B 50/33

(Continued)

(56) References Cited

U.S. PATENT DOCUMENTS

| 1,009,451 | A | * | 11/1911 | Subert | .................... | B65D 85/32 |
| | | | | | | 217/54 |
| 2,159,050 | A | * | 5/1939 | Quamma | ........... | B65G 47/1421 |
| | | | | | | 193/47 |

(Continued)

FOREIGN PATENT DOCUMENTS

| WO | WO 98/14052 | 4/1998 |
| WO | WO 02/082890 | 10/2002 |
| WO | WO 2009/094204 | 7/2009 |

OTHER PUBLICATIONS

Search Report dated Apr. 28, 2014 out of French priority Application No. 1359201 (7 pages).

(Continued)

*Primary Examiner* — Gregory W Adams
(74) *Attorney, Agent, or Firm* — Brinks Gilson & Lione; G. Peter Nichols

(57) ABSTRACT

A device for reorientation of eggs deposited in the hollow open cells of a tray. The device is intended to reorientate at least one egg from said tray along a substantially vertical axis. The device includes at least one reorientation element capable of moving between a low position and a high position with respect to the cell containing the egg to be reorientated. The reorientation element includes a lower seat on which the upright rods are fixed, the upper ends of said rods being able to spread out with respect to each other on contact with the egg to be re-orientated, the upright rods being intended to interpose themselves between the cell and the egg, in the high position, so as to damp and guide a movement of the egg under the effect of its weight to a substantially vertical position.

4 Claims, 2 Drawing Sheets

(58) Field of Classification Search
USPC ....... 119/322; 193/45, 46, 47; 206/559, 563,
206/591; 220/508; 414/757, 760, 768,
414/770, 778, 779, 780, 781; 53/244,
53/246, 367, 544
See application file for complete search history.

(56) References Cited

U.S. PATENT DOCUMENTS

| | | | | |
|---|---|---|---|---|
| 2,177,595 | A * | 10/1939 | Freed | B65B 23/08 |
| | | | | 294/100 |
| 3,463,292 | A * | 8/1969 | Halbe | A01K 43/00 |
| | | | | 198/389 |
| 3,478,862 | A * | 11/1969 | Niederer | A01K 43/00 |
| | | | | 198/389 |
| 4,645,058 | A * | 2/1987 | Meyn | B65B 23/06 |
| | | | | 198/400 |
| 4,750,316 | A * | 6/1988 | Bliss | B65B 23/06 |
| | | | | 53/246 |
| 6,527,498 | B2 * | 3/2003 | Chalker, II | A01K 45/007 |
| | | | | 119/6.5 |
| 7,601,312 | B2 * | 10/2009 | Riley | A61L 2/26 |
| | | | | 248/309.1 |
| 2012/0180436 | A1 * | 7/2012 | Chait | B41J 3/4073 |
| | | | | 53/473 |

OTHER PUBLICATIONS

International Search Report and Written Opinion dated Nov. 24, 2014 out of PCT priority Application No. PCT/FR2014/052104 (8 pages).

* cited by examiner

DEVICE FOR REORIENTATION OF AN EGG IN A CELLULAR TRAY

This application claims priority to International Application No. PCT/FR2014/052104 filed Aug. 20, 2014 and to French Application No. 1359201 filed Sep. 24, 2013; the entire contents of each are incorporated herein by reference.

TECHNICAL FIELD

In the poultry-farming industry, eggs are often placed in cells or trays equipped with cells. These trays and cells are handled by automated means and the movements of the latter result in movements of the egg in the tray or cell, which offsets the axis of the egg from the vertical axis. The present invention relates to a device for reorientation or repositioning of eggs deposited in the cells of a tray in relation to a determined axis, generally the vertical axis. One application of the invention can more particularly be found in machinery intended to handle or work with eggs, such as machines for injecting substances into the eggs and requiring the eggs to be in a strictly upright position.

PRIOR ART

Treatment substances, such as vaccines, antibiotics or vitamins, are known to be injected into fertilized eggs in order to optimize the quality and/or development of embryos. Substances are also known to be injected into live eggs to manufacture vaccines for humans. It may also be necessary to insert tools into eggs for observation purposes or to remove contents or more simply in order to perform simple or complex handling operations.

The machinery performing these operations are generally configured to come into contact or to pierce the egg at different angles of approach, however the position of the egg, ideally along its vertical axis, ensures that its internal contents are positioned in a predictable manner and therefore allow for the desired handling operation to take place with the highest possible probability of success. The eggs to be treated are generally positioned on a tray comprising a plurality of cells, each egg being positioned in a cell of the tray, the pointed tip of the egg generally being orientated downwards. Given that the bottom of the cells of the tray are generally open, the eggs can be pierced from the top or from the bottom or at any angle, however their upright position ensures the predictable layout of the components or membranes contained in the egg. Indeed, the contents of the egg, which are mainly liquid, contain components or membranes that evolve over time and that move either passively via gravity or actively (embryo contractions) to adopt a predictable position that depends on the position of the egg.

In the example of the injection machine, the needle can penetrate the egg via its most rounded end (or "broad end" of the egg) or via one side of the egg. It all depends on where the substance must be injected. For example, if one is looking to inject the substance into the chorioallantoic liquids of the egg, the injection will take place from the top (the most rounded end). It can also take place from the side if one is looking to insert a material into one of the fetal membranes that cannot be accessed from the top. In all cases, it is the positioning of the longitudinal axis of the egg in relation to the vertical axis that enables the anatomical position of a given component or fetal membrane of the egg to be predicted.

The injection or handling may take place at any time before, during or after incubation.

Traditionally, the machines are configured to handle or treat eggs whose longitudinal axis is substantially vertical. However, some eggs are often incorrectly positioned in the cells of the tray and have a longitudinal axis that is inclined in relation to the vertical axis. This can be the result of different factors, and in particular occurs if, during their incubation, the egg trays are regularly inclined, generally several times a day. In practice, the trays are firstly positioned at an angle of +45° in relation to the vertical axis for half a day, then at −45° in relation to the vertical axis for the next half of the day and so on and so forth. The incorrect positioning of the eggs can also result from the handling of trays filled with eggs or from the transfer of eggs from one container to another. The movement of the trays or of the suction grippers can therefore offset certain eggs positioned in the cells of the tray from their original axis. The eggs must therefore be realigned or repositioned before handling or treatment.

In the current prior art, few efficient tools exist for realigning the eggs.

The patent request WO 2009/094204 describes a device intended to reorientate the eggs on an incubation tray, said device comprising a vibration mechanism intended to transmit a vibratory movement to the tray and to the eggs that it contains in the hope that the latter will realign themselves along a substantially vertical axis. Such a method does not always work properly as the nature of the tray and the friction do not allow the eggs to realign themselves in accordance with the axis without guiding.

SUMMARY OF THE INVENTION

The purpose of the invention is to propose another solution for reorientating the eggs deposited in a tray.

Another purpose of the invention is to propose a solution for reorientating the eggs along a substantially vertical axis without changing tray.

The present invention relates to a device for reorientation of eggs deposited in the hollow cells of a tray, the bottom of said cells being open, said device being intended to reorientate at least one egg from said tray along a substantially vertical axis. According to the invention, the device comprises at least one reorientation element capable of moving between a low position and a high position with respect to the cell containing the egg to be reorientated, said reorientation element comprising a lower seat on which upright rods are fixed, the upper ends of said rods being able to spread out with respect to each other on contact with the egg to be reorientated, the upright rods being intended to interpose themselves between the cell and the egg, in the high position, so as to damp and guide a movement of the egg under the effect of its weight to a substantially vertical position.

As such, according to the invention, the egg naturally slides between the upper ends of the rods of the reorientation element to recover a substantially vertical longitudinal axis. The reorientation of the egg is initiated by the upper ends of the rods, which move the egg away from the cell. The egg then repositions itself into the substantially vertical position under the effect of its own weight.

According to one embodiment, the upright rods are flexible and the lower seat is flexible or inflexible. The rods become deformed and curved on contact with the egg when the reorientation element is moved from its low position to its low position.

According to another embodiment, the lower seat is made from a flexible or elastic material, and is therefore deformable. The rods can therefore be rigid or flexible. In this embodiment, it is the seat that is deformed when the rods are in contact with the egg. The rods spread out with respect to each other on contact with the egg. According to one example embodiment, the lower seat is made from silicone.

Alternatively, the lower seat comprises a mechanism for articulating the lower parts of the rods, enabling the upper ends to spread out with respect to each other when an egg is in contact with the rods.

According to one specific embodiment, the rods are positioned such as to form a cone or funnel shape, once the rods have spread out with respect to each other on contact with the egg, thus easing its sliding into the vertical axis.

Advantageously, the rods are shaped to come into contact with the shell of the egg at one or two contact points, or at a reduced number of contact points, so as to reduce the potential friction zones and optimize the sliding of the egg between the rods.

According to one specific embodiment, the rods have a loop at their upper end, the rods being in contact with the egg shell through said loops.

Alternatively, the rods have, at their upper end, a ball or a conical bulge similar to a loop or a ball, the rods being in contact with the egg shell through said balls. The shape of the ball or bulge is designed such that its contact with the egg is reduced to a minimum, preferably to a single contact point to reduce friction.

According to one specific embodiment, the reorientation element comprises n rods where n≥3, the lower ends of said rods being positioned and fixed to the lower seat according to an equilateral polygon.

In a first example embodiment, the reorientation element comprises three rods, the lower ends of which are positioned and fixed to the lower seat according to an equilateral triangle. According to another example, the reorientation element comprises four rods, the lower ends of which are positioned and fixed to the lower seat at the four corners of a square. According to one specific embodiment, the lower end of the rods is molded into the lower seat.

According to one embodiment, the rods comprise an upper end shaped such that it can slide in the cell during the upwards or downwards movement of the lower seat. The loop or the ball at the end of the rod allows for such sliding.

According to one embodiment, the device being intended to reorientate the eggs of a tray comprising n hollow cells organized into rows, said device comprises n reorientation elements, each reorientation element being intended to reorientate one egg in the tray.

BRIEF DESCRIPTION OF THE FIGURES

These and other advantages will become apparent to those skilled in the art upon reading the following examples, illustrated by the accompanying figures, provided for the purposes of illustration only.

DETAILED DESCRIPTION OF AT LEAST ONE EMBODIMENT OF THE INVENTION

Figure 1:
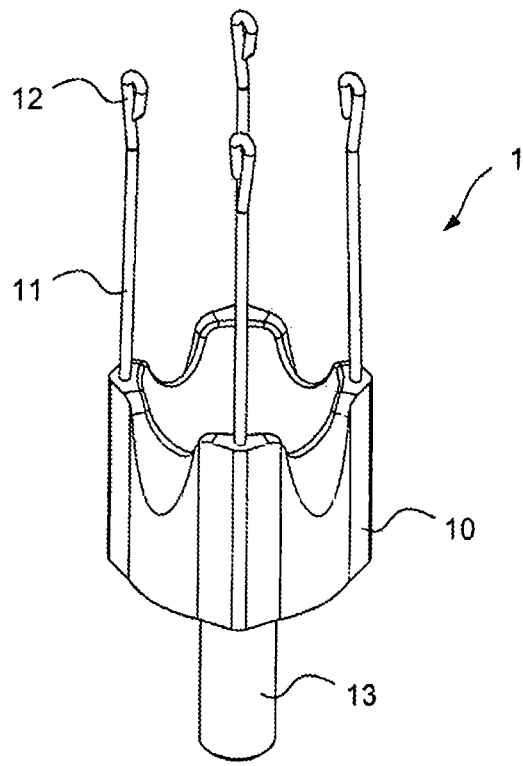
FIG. 1 is a perspective view of a reorientation element according to the invention.
Figure 2:
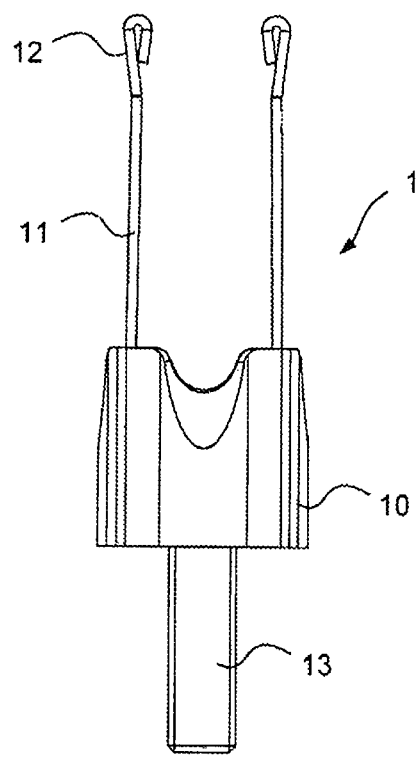
FIG. 2 is a side view of the reorientation element in FIG. 1.
Figure 3:
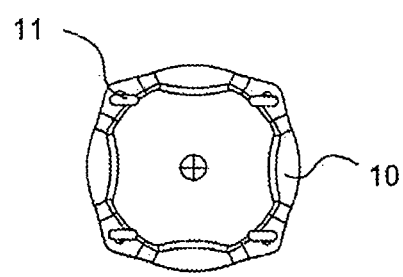
FIG. 3 is an overhead view of the reorientation element in FIG. 1.

According to the invention, the reorientation device for eggs deposited in the cells of a tray comprises at least one reorientation element 1 as illustrated in FIGS. 1 to 3. This reorientation element is capable of moving from a low position to a high position and from a high position to a low position with respect to the cells of the plate. This movement of the reorientation element 1 is performed by suitable movement means, for example by pneumatic or mechanical movement means.

With reference to FIGS. 1 to 3, the reorientation element 1 comprises a lower seat 10 on which upright rods or barbs 11 are fixed, the upper ends of which can be spread out with respect to each other on contact with the egg to be reorientated. These barbs are intended to interpose themselves between the egg and the tray when the reorientation element is in the high position so as to damp and guide a movement of the egg under the effect of its weight to a substantially vertical position. A vertical position of the egg is understood as being a position of the egg wherein the longitudinal axis of the egg (passing through the pointed end and the rounded end of the egg) is substantially vertical.

Therefore, when the reorientation element is in the high position, the egg is moved away from the cell by the upper ends of the barbs and then slides, under the effect of its own weight, between the latter and/or along the latter (cone or funnel shape) to recover a longitudinal axis that is substantially vertical.

In the example embodiment in FIGS. 1 to 3, the reorientation element comprises four barbs 11 positioned at the four corners of a square.

In a more general manner, the reorientation element can comprise n barbs where n≥3, the lower ends of the barbs being positioned and fixed to the lower seat according to an equilateral polygon.

In order for the barbs 11 to be able to spread out with respect to each other on contact with the egg, either flexible barbs 11 or a seat 10 made from a flexible material is used, or both are used at the same time.

The barbs are, for example, metal rods and the seat is, for example, made from silicone. The lower end of the barbs 11 is molded into the silicone seat 10. In this case, when the barbs come into contact with the egg, they spread out with respect to each other by becoming slightly curved and/or by moving in the seat.

According to one embodiment, instead of using flexible barbs molded from a deformable or non-deformable material, one could consider a lower seat that comprises a mechanism for articulating the lower ends of the rods, enabling the upper ends to spread out with respect to each other when an egg is in contact with the rods.

In order to encourage the egg to slide between the barbs 11, a loop 12 is provided at the upper end of each of the barbs 11. The advantage of this loop is that it is not aggressive towards the egg. It is also used to reduce friction with the egg and limit the number of contact points between the egg and the barb.

Alternatively, the upper end of each barb can comprise a ball made from metal or a suitable material in order to optimize the sliding of the egg on the ball. The ball can, for example, be made from ceramic.

The center of the seat 10 is hollow to prevent the pointed tip of the egg from coming into contact with it when the barbs 11 are spread out. Alternatively, a seat could be designed that is not hollow, wherein the length of the barbs and their spreading are defined so that the egg, regardless of its size and weight, does not come into contact with the seat when the barbs are spread.

The seat 10 is further equipped with a rod, referred to as a linking rod 13, to connect the reorientation element 1 with vertical movement means intended to move the reorientation element between a low position and a high position. This linking rod 13 is, for example, a threaded rod intended to be screwed onto a plate that can be moved by a pneumatic cylinder.

FIGS. 4a to 4d illustrate the reorientation operation of an egg using the reorientation element 1. The egg, bearing the reference number 2, is deposited in a cell 3 of an egg tray.

Figure 4D:
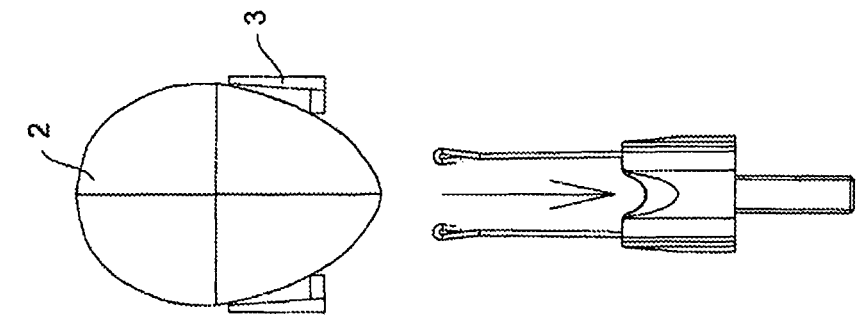
FIGS. 4a to 4d illustrate the movement of the reorientation element in FIG. 1 for reorientating an egg deposited in a cell of an egg tray.
Figure 4C:
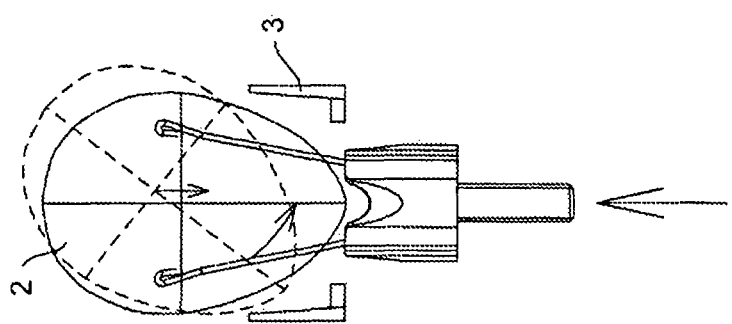
Figure 4B:
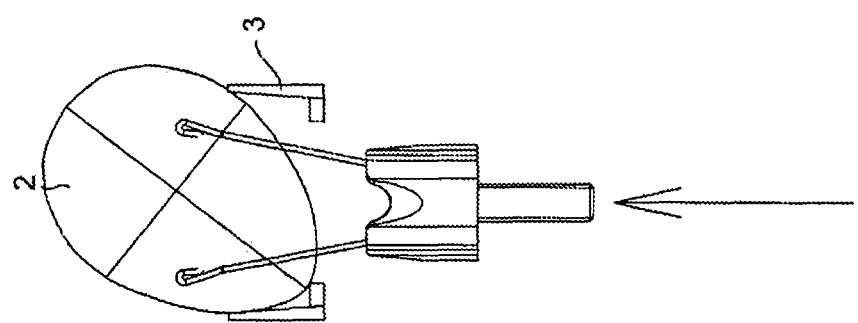
Figure 4A:
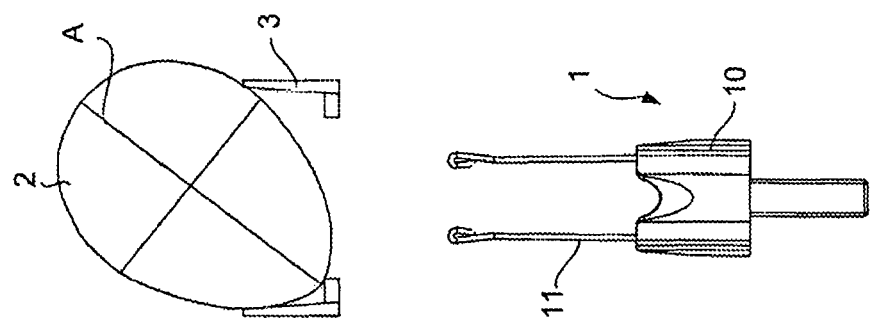

Before reorientation, the longitudinal axis A of the egg is inclined in relation to the vertical axis as illustrated in FIG. 4a. The egg 2 rests on the walls of the cell 3. The reorientation element 1 is in the low position.

In order to reorientate the egg 2, the reorientation element 1 is moved from the low position to a position as illustrated in FIG. 4b. The barbs 11 then become interposed between the egg 2 and the walls of the cell 3. In contact with the egg, the upper ends of the barbs 11 spread out with respect to each other, then lift the egg 2.

The egg 2 is no longer in contact or has reduced contact with the walls of the cell 3 and slides under the effect of its weight to a substantially vertical position as illustrated in FIG. 4c. The longitudinal axis A of the egg is thus substantially vertical.

The reorientation element 1 then returns to the low position as illustrated in FIG. 4d.

The realigned egg 2 is then lowered until it rests on the walls of the cell 3. The looped shape of the upper end of the barbs both encourages the sliding of the egg between the barbs and the sliding of the barbs against the walls of the cell if the former are brought into contact with the walls of the cell during the upwards or downwards movement of the reorientation element.

The reorientation operation for the eggs can take place on trays, at least the bottom of which is open, this opening being traditionally provided to encourage the circulation of hot air around the eggs during incubation operations.

The reorientation operation can take place prior to an operation for the injection of a treatment substance into the eggs or prior to an egg candling operation. In this last case, it can be beneficial to reposition the egg vertically to ease the detection of embryos via image processing or other processing operation.

In a general manner, the reorientation element 1 must comprise at least three barbs 11 positioned according to an equilateral triangle or according to an equilateral polygon to lift the egg and distance it from the tray when the reorientation element is moved from the low position to the high position.

The presence of loops or balls at the upper ends of the barbs 11 provides for a non-aggressive contact with the egg and reduces the number of contact points between the egg and each of the barbs. Preferably, the upper end of the barb is shaped, by the presence of a loop or a ball, such that there is a single contact point between the egg and each of the barbs in order to encourage the sliding of the egg.

It should be noted that the speed of the upward movement, and secondarily the speed of the downward movement, of the reorientation element is preferably high so that the pulse transmitted to the egg is sufficient to ease its repositioning and its lowering back into the vertical position.

In order to reorientate the eggs contained in a whole tray, the device advantageously comprises a plurality of reorientation elements 1. These reorientation elements are positioned in relation to each other in rows similarly to the eggs in the cells of the tray. If the tray comprises n cells, the device can comprise n reorientation elements or a lower number of elements corresponding to the number of eggs in one or more rows of the tray. For example, if the tray comprises m rows of p eggs, where m is an even number, the device can comprise (m*p)/2 reorientation elements organized into m/2 rows of p reorientation elements. The reorientation of the eggs of the tray therefore takes place in two successive steps.

The reorientation elements 1 are fixed by the linking rods 13 onto a plate capable of moving between the low position and the high position. The fastening of the rods on the plate can, for example, take place by screwing. The plate is, for example, moved by pneumatic means.

Although the invention has been described with regard to a specific embodiment, it is clear that the invention is in no way limited thereto and that it comprises all technical equivalents to the means described, as well as any combination thereof if the latter falls within the scope of the invention. Alternatives can in particular be considered, using a different number of barbs or using different materials.

The invention claimed is:

1. A device for reorientation of eggs deposited in the hollow open cells of a tray, the device being intended to reorientate at least one egg from the tray along a substantially vertical axis, and comprising at least one reorientation element capable of moving between a low position and a high position with respect to the cell containing the egg to be reorientated, the reorientation element comprising a lower seat on which upright rods are fixed, the upper ends of the rods being able to spread out with respect to each other on contact with the egg to be reorientated, the upright rods being intended to interpose themselves between the cell and the egg, in the high position, so as to damp and guide a movement of the egg under the effect of its weight to a substantially vertical position, wherein the upper end of the rods is shaped to come into contact with the shell of the egg at one or two points, to reduce friction and optimize the sliding of the egg between the rods and the rods have a loop at their upper end, the rods being in contact with the egg shell through said the loops.

2. The device according to claim 1 wherein the upright rods are flexible.

3. The device according to claim 1, wherein the reorientation element comprises three or four rods, the lower ends of the rods being positioned and fixed to the lower seat according to an equilateral polygon.

4. The device according to claim 1, wherein the device being intended to reorientate the eggs of a tray comprising n hollow cells organized into rows, it comprises n reorientation elements, each reorientation element being intended to reorientate one egg from the tray.

* * * * *